United States Patent [19]
Axelrod et al.

[11] 3,759,494
[45] Sept. 18, 1973

[54] VALVE PLATE OF COLUMN STILL
[76] Inventors: Lev Samuilovich Axelrod,
Michurinsky prospekt, 18, korpus 2, kv. 51; Alexandr Vasilievich Akatov, ulitsa Scherbakovskya, 5, kv. 13; Valery Mikhailovich Rudenko, Kutuzovsky prospekt, 18, kv. 4; Viktor Viktorovich Fedorov, Banny pereulok, 4, kv. 89; Ruslan Yakovlevich Barashkov, Bezbozhny pereulok, 13, korpus 17, kv. 4, all of Moscow; Boleslav Iosifovich Garbuzovsky, ulitsa Maluntseva, 17a, kv. 6, Omsk, all of U.S.S.R.

[22] Filed: July 21, 1971
[21] Appl. No.: 164,579

[52] U.S. Cl................... 261/79 A, 261/84, 261/93, 261/114 A, 261/114 VT
[51] Int. Cl............................................... B01f 3/04
[58] Field of Search..................... 261/79 A, 114 A, 261/114 VT, 84, 93

[56] References Cited
UNITED STATES PATENTS

| 1,939,583 | 12/1933 | Welshausen | 261/114 VT X |
| 1,967,799 | 7/1934 | Wittemann | 261/79 A |
| 2,391,464 | 12/1945 | Larsen | 261/114 A |
| 2,391,502 | 12/1945 | O'Brien | 261/114 A |
| 3,055,646 | 9/1962 | Eld et al. | 261/114 VT |
| 3,618,913 | 11/1971 | Schramm | 261/114 VT |

FOREIGN PATENTS OR APPLICATIONS

| 4,213,688 | 6/1964 | Japan | 261/114 VT |

Primary Examiner—Tim R. Miles
Assistant Examiner—Richard L. Chiesa
Attorney—Eric H. Waters et al.

[57] ABSTRACT

A valve plate of a column still for mass transfer between gas and liquid wherein the valves are shaped like cones with their apices pointing down and the side surfaces of said valves have grooves for rotating the valves by the force of the gas flowing through said valves. Installed above the valves are the valve lift checks.

2 Claims, 6 Drawing Figures

VALVE PLATE OF COLUMN STILL

The present invention relates to the equipment for mass-transfer processes between gas and liquid and more specifically it relates to the valve plates of column stills and can be of use in petroleum-refining, petrochemical, wood-chemical and other industries.

Known in the art are valve plates of column stills (see U.S. Pat. No. 2,772,080) comprising a tray with disc valves. In operation still the liquid delivered onto the plate tray spreads over it, flowing towards the draining device around the valves fitting in their seats. The vapor (or gas) passing through the still lifts the valve above its seat, passes through the gap between the valve and seat onto the plate tray and bubbles through the liquid.

However, a disadvantage of the known valve plates lies in that their valves are sensitive to deviations from horizontality of the plate and from flatness of its tray (in case the plate happens to be bent); besides, they are characterized by reverse mixing caused by pulsating operation of the valves and by the parts of valve units protruding above the plate tray.

Besides, the valves of the known plates have a tendency to jamming and loose fitting in their seats when the still handles polluted media and if the valves become corroded by aggressive media. The use of the known plates is difficult due to their complicated installation in the still.

Also known in the art are the plates of column stills fitted with ball (spherical) valves. Unlike the plates with disc valves, the ball valves are not sensitive to deviations from horizontality and flatness of the plate tray and they have no such defects as reverse mixing, jamming and loose fitting to the seats while handling polluted media. However, the ball valves of these plates are also liable to corrosion and wear which distort their shape with resultant loose fitting of the valve in the seat, and jamming. Besides, the liquid gradient, i.e., the difference in the height of the liquid along the length of the plate, results in nonuniform bubbling of gas through the liquid which impairs the accuracy of separation in mass-transfer stills utilizing the above-described plates.

An object of the invention is to provide a valve plate of a column still for mass-transfer processes between gases and liquid which would be guaranteed against jamming and sticking of the valves, would have valves less sensitive to the deviations from horizontality and flatness of the plates than the valves of the known plates, and would be characterized by diminished corrosion of valves, and by the absence of liquid gradient and reverse mixing on the plate. This would intensify the mass-transfer processes in the still, increase the accuracy of separation, and the life of the valves.

This object is carried into effect by providing a valve plate of a column still for mass-transfer processes between gas and liquid, comprising a tray with valves in which, according to the invention, the plate valves are made in the form of cones with their apices pointing down and are provided with lift checks, the side surface of said valves being provided with grooves for imparting rotary motion to the valves by the force of the gas flowing through said valves.

It is practicable that the valve lift check should be made in the form of an inverted cup installed above the valve, fitting against the plate tray, provided with hydraulically streamlined walls, and having slots for the directional passage of the gas, the size and number of these slots being selected so as to prevent penetration of the liquid under said valve lift checks.

Such a valve plate features a high efficiency and reliability, since its valves are not sensitive to deviations from horizontality and flatness of the plate, they do not get jammed and fit tightly against their seats while handling polluted media, and are not liable to corrosion while handling aggressive media.

There is no reverse mixing in the valve plates according to the invention, and their installation on the still is simple and easy.

Now the invention will be described in detail by way of example with reference to the accompanying drawings in which.

Figure 1:
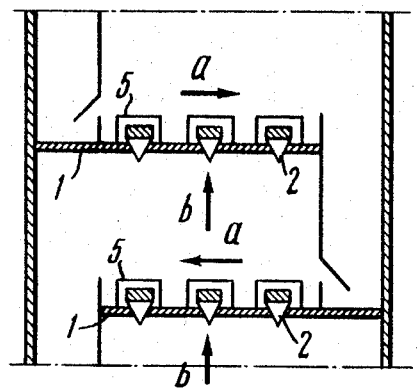
FIG. 1 is a longitudinal section of the column still fitted with a valve plate according to the invention.
Figure 2:
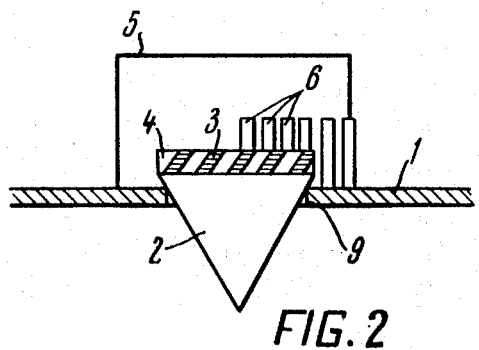
FIG. 2 is a longitudinal section of the valve according to the invention, enlarged.
Figure 3:
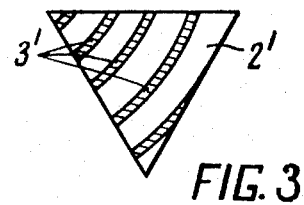
FIG. 3 is another version of the valve according to the invention.

The valve plate of a column still for mass-transfer processes between gas and liquid comprises a tray 1 (FIG. 1) with holes whose edges function as seats for valves 2. The valves 2 are made in the form of cones whose apices point down. The side surface of the valve is provided with grooves 3 (FIG. 2) which are used to make the valve 2 rotate around its own axis due to the force of the gas flow passing through the valve 2, thus stabilizing the position of said valve 2 above the seat while the gas is passing through the still. The grooves 3 may be made either only on the upper part 4 of the side surface of the valve 2, protruding above the plate tray 1, or over the entire side surface, as grooves 3' of the valve 2' (FIG. 3). The upper part 4 (FIG. 3) may be made cylindrical for better stabilization of the position of the valve 2. The conical shape of the valve 2 improves its fitting in the seat and prevents the danger of jamming in case of deviations from horizontality or flatness of the valve plate tray 1.

Figure 4:
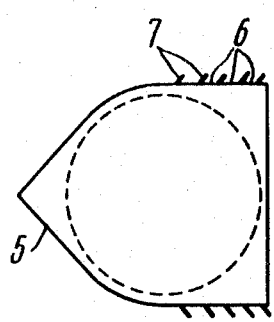
FIG. 4 is a top view of the valve shown in FIG. 2 according to the invention.
Figure 5:
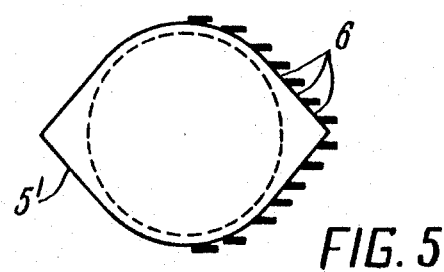
FIG. 5 is a top view of a version of the valve lift check according to the invention.

The valve 2 is provided with a valve lift check 5. Said check 5 is made in the form of an inverted cup installed above the valve 2 and fitting against the tray 1 of the valve plate. The walls of the check 5 may have different shapes (e.g. the walls of the check 5 in FIG. 4 and those of the check 5' in FIG. 5, but they must be hydraulically streamlined.

The height of the valve lift checks is selected so that the maximum lift of the valve 2 would not exceed its height.

Figure 6:
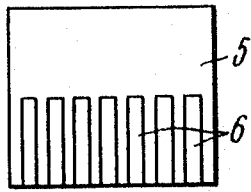
FIG. 6 is a view along arrow A in FIG. 4.

The walls of the valve lift check 5 are provided with slots 6 (FIGS. 4, 6) for the directional passage of gases through them. The edges 7 (FIG. 4) of the slots 6 are bent in such a direction as to make the flow of the gas leaving the lift check 5 coincide in direction with the flow of the liquid over the valve plate of the column still. This will tell favorably on the hydrodynamic nature of the liquid flow over the valve plate tray towards the drain.

The size and number of the slots 6 should be set so as to prevent the liquid flowing over the valve plate from penetrating under the valve lift check 5. This protects the valves 2 against corrosion thereby extending the life of the valves, particularly when the still handles aggressive media.

The valve plate of the column still for mass transfer between gases and liquids functions as follows.

Being delivered onto the valve plate tray 1 (FIG. 1) the liquid flows towards the draining device, moving around the valve lift checks 5 (the direction of liquid flow is shown by arrows $a$).

The gas (or vapor) flowing up through the column still (the direction of gas flow is shown by arrows $b$) lifts the valves 2 above their seats and passes through the gaps between the valves and seats under the valve lift checks 5, making the valves 2 rotate owing to the provision of grooves 3 (FIG. 2) on their side surfaces, which stabilizes the position of the valves 2 above their seats, and thereby ensuring accurate alignment of the valve when it goes down onto its seat due to the fluctuations of the gas flow.

Then the gas leaves the valve lift checks 5 through the slots 6 and interacts with the liquid moving over the valve plate. The provision of valve lift checks 5 actually eliminates reverse mixing of the liquid.

The size and number of the slots 6 keeps the liquid from penetrating under the lift checks 5.

Owing to the above-described structural features, the claimed valve plates step up the efficiency and reliability of the column still in which they are installed.

What is claimed is:

1. A valve plate of a column still for mass transfer processes between gas and liquid comprising: holes in said plate; valves closing said holes, made in the form of cones with apices pointing down; grooves located on the side surface of said valves and intended to impart rotary motion to said valves due to the force of the gas flow passing through the valves; checks limiting the lift of said valves.

2. A valve plate according to claim 1 wherein said valve lift check is made in the form of an inverted cup installed above said valve, fitting against said plate and having hydraulically streamlined walls which are provided with slots for the directional passage of the gas, the size and number of said slots being selected so as to prevent the liquid flowing over said valve plate from penetrating under said valve lift checks.

* * * * *